(12) United States Patent
Cooley (10) Patent No.: US 9,047,368 B1
(45) Date of Patent: Jun. 2, 2015

(54) SELF-ORGANIZING USER-CENTRIC DOCUMENT VAULT

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 150 days.

(21) Appl. No.: 13/770,869

(22) Filed: Feb. 19, 2013

(51) Int. Cl.
*G06F 17/30* (2006.01)

(52) U.S. Cl.
CPC .............................. *G06F 17/30705* (2013.01)

(58) Field of Classification Search
CPC ................... G06F 17/30705; G06F 17/30707; G06F 17/30713
USPC ........................................................ 707/737
See application file for complete search history.

(56) References Cited

U.S. PATENT DOCUMENTS

| | | | | |
|---|---|---|---|---|
| 6,792,415 B2 * | 9/2004 | Shih et al. | | 1/1 |
| 7,028,250 B2 * | 4/2006 | Ukrainczyk et al. | | 715/202 |
| 2004/0006457 A1 * | 1/2004 | Dehlinger et al. | | 704/5 |
| 2004/0172600 A1 * | 9/2004 | Evans | | 715/517 |
| 2005/0044487 A1 * | 2/2005 | Bellegarda et al. | | 715/511 |
| 2005/0065959 A1 * | 3/2005 | Smith et al. | | 707/102 |
| 2005/0125402 A1 * | 6/2005 | Viola et al. | | 707/6 |
| 2007/0109297 A1 * | 5/2007 | Borchardt et al. | | 345/419 |
| 2007/0156732 A1 * | 7/2007 | Surendran et al. | | 707/101 |
| 2008/0021896 A1 * | 1/2008 | Turski et al. | | 707/5 |
| 2009/0119343 A1 * | 5/2009 | Jiao et al. | | 707/200 |
| 2010/0150448 A1 * | 6/2010 | Lecerf et al. | | 382/190 |
| 2010/0198864 A1 * | 8/2010 | Ravid et al. | | 707/769 |

\* cited by examiner

*Primary Examiner* — Jorge A Casanova
(74) *Attorney, Agent, or Firm* — Brill Law Office; Jeffrey Brill (57) ABSTRACT

Multiple documents associated with a user are retrieved from one or more sources. Textual elements in the documents are identified, and the documents are classified according to document type. Cluster keys are identified in the documents, based on document content and document classification. A cluster key comprises an association between a document and a specific entity associated with the individual user, around which to cluster associated documents. Identifying cluster keys for a document can take the form of performing feature reduction, and identifying any features remaining thereafter as cluster keys. Names and addresses other than those of the document recipient can be identified as cluster keys. Retrieved documents, identified cluster keys and associations between them are stored, thereby organizing documents into clusters based on entities associated with the individual user. The user is provided with access to the documents according to the clusters into which they are organized.

19 Claims, 4 Drawing Sheets

SELF-ORGANIZING USER-CENTRIC DOCUMENT VAULT

TECHNICAL FIELD

This disclosure pertains generally to computerized document storage and organization systems, and more specifically to automatically clustering documents around entities associated with individual users.

BACKGROUND

Existing computerized document storage and organization systems are targeted to enterprises and other institutions, not to individuals. The default folders and other organizational and hierarchical structures tend to be based on an enterprise-centric view of the types of documents to be stored, and the ways in which the documents are to be organized. Any deviation from the system defaults requires manual configuration and document classification. This is tedious at best, and makes these storage and organization systems difficult for the average consumer to use.

It would be desirable to address these issues.

SUMMARY

Documents are clustered around entities associated with an individual user, thereby enabling the individual user to intuitively identify and access the documents. Multiple documents associated with the individual user are retrieved from one or more sources. Textual elements (and in some cases graphical elements) are identified in the retrieved documents. Where a retrieved document is in an image based format, optical character recognition can be performed to allow the identification of textual elements. Documents are classified according to document type, based on identified textual elements, and in some cases also on other factors such as the layout of the document. Classifying documents according to document type can further comprise performing keyword based classification, in which documents are classified as being of given types based on the presence of specific keywords. Image based document classification can also be performed, such as classifying a document according to its layout.

Cluster keys are identified in the documents, based on document content and document classification (e.g., the document's content taken in light of its type). A cluster key comprises an association between a document and a specific entity (e.g., person, place or thing) associated with the individual user, around which to cluster associated documents. Identifying cluster keys for a document can take the form of performing feature reduction (e.g., stripping out dictionary words, punctuation marks, monetary amounts, percentages and the like), and identifying any features remaining thereafter as being cluster keys. When processing documents classified as being of a type for which names and addresses are likely cluster keys, any names and addresses in the document are found. It is then determined whether each found name or address is that of the recipient of the document. Where the name or address is not that of the recipient of the document, it is identified as a cluster key. However, where the name or address is that of the recipient, it is identified as not comprising a cluster key, because the recipient is likely the user, and it is typically not desirable to cluster documents around the user's name or address.

Retrieved documents, identified cluster keys and associations between them are stored. This has the effect of organizing documents into clusters based on entities associated with the individual user. It is to be understood that a single document can be included in multiple clusters, and a single specific entity can be associated with multiple cluster keys. The user can be provided with access to the documents according to the clusters into which they are organized. For example, listings of documents organized according to clusters can be displayed to the user.

It can be determined that one or more clusters are erroneous, for example because a cluster contains unrelated documents, based on groupings of documents between multiple clusters or in response to receiving input from the user. Clusters determined to be erroneous are removed. The user can also manually enter cluster keys, which are then used to create clusters when located in retrieved documents. Automatically created cluster keys can also be deleted in response to an indication from the user. Such user entered indications are tracked so that the deleted cluster keys are not recreated. Additionally, documents can be added to, removed from or moved between clusters based on received user directives. The user can also indicate specific content to strip out of documents during feature reduction.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
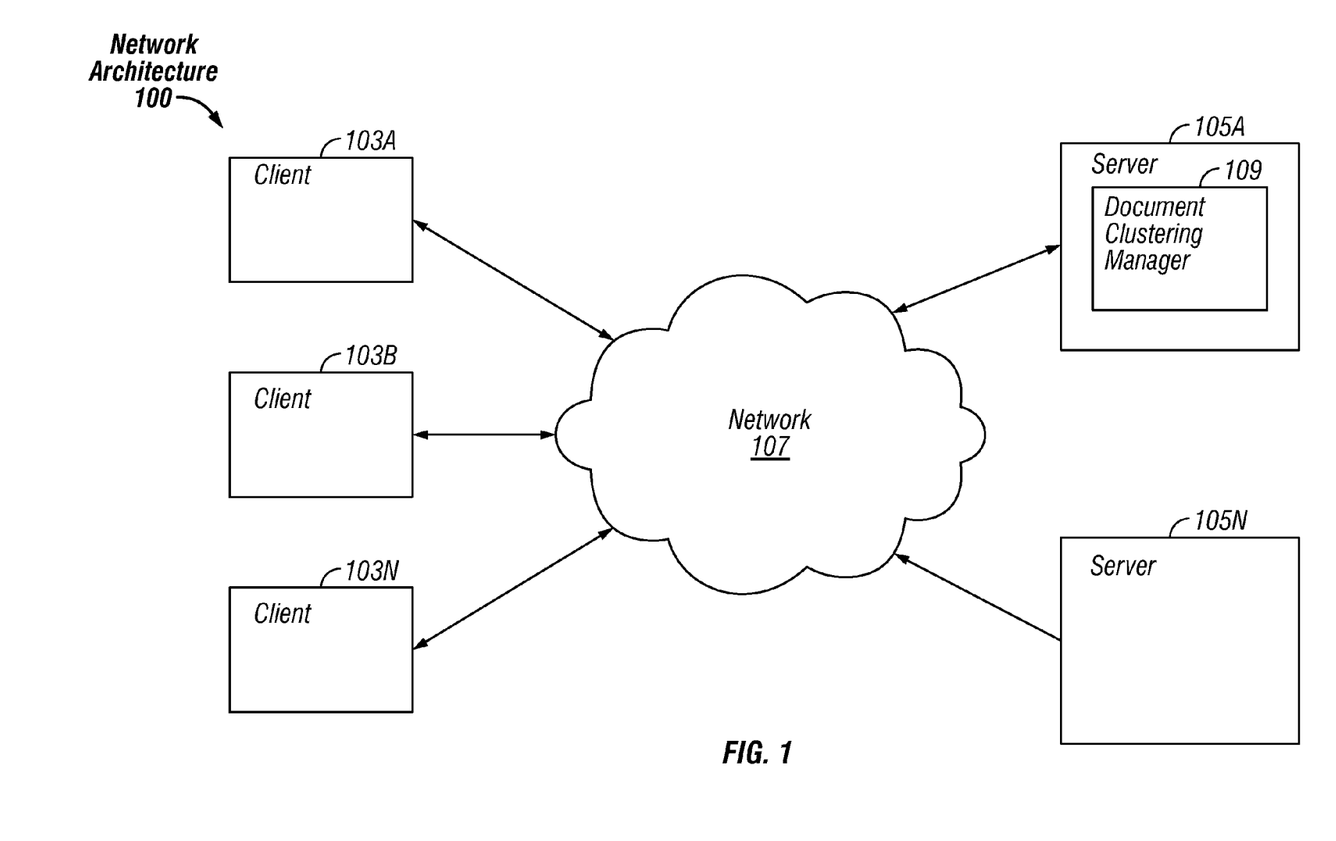
FIG. 1 is a block diagram of an exemplary network architecture in which a document clustering manager can be implemented, according to some embodiments.

FIG. 1 is a block diagram illustrating an exemplary network architecture 100 in which a document clustering manager 101 can be implemented. The illustrated network architecture 100 comprises multiple clients 103A, 103B and 103N, as well as multiple servers 105A and 105N. In FIG. 1, the document clustering manager 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
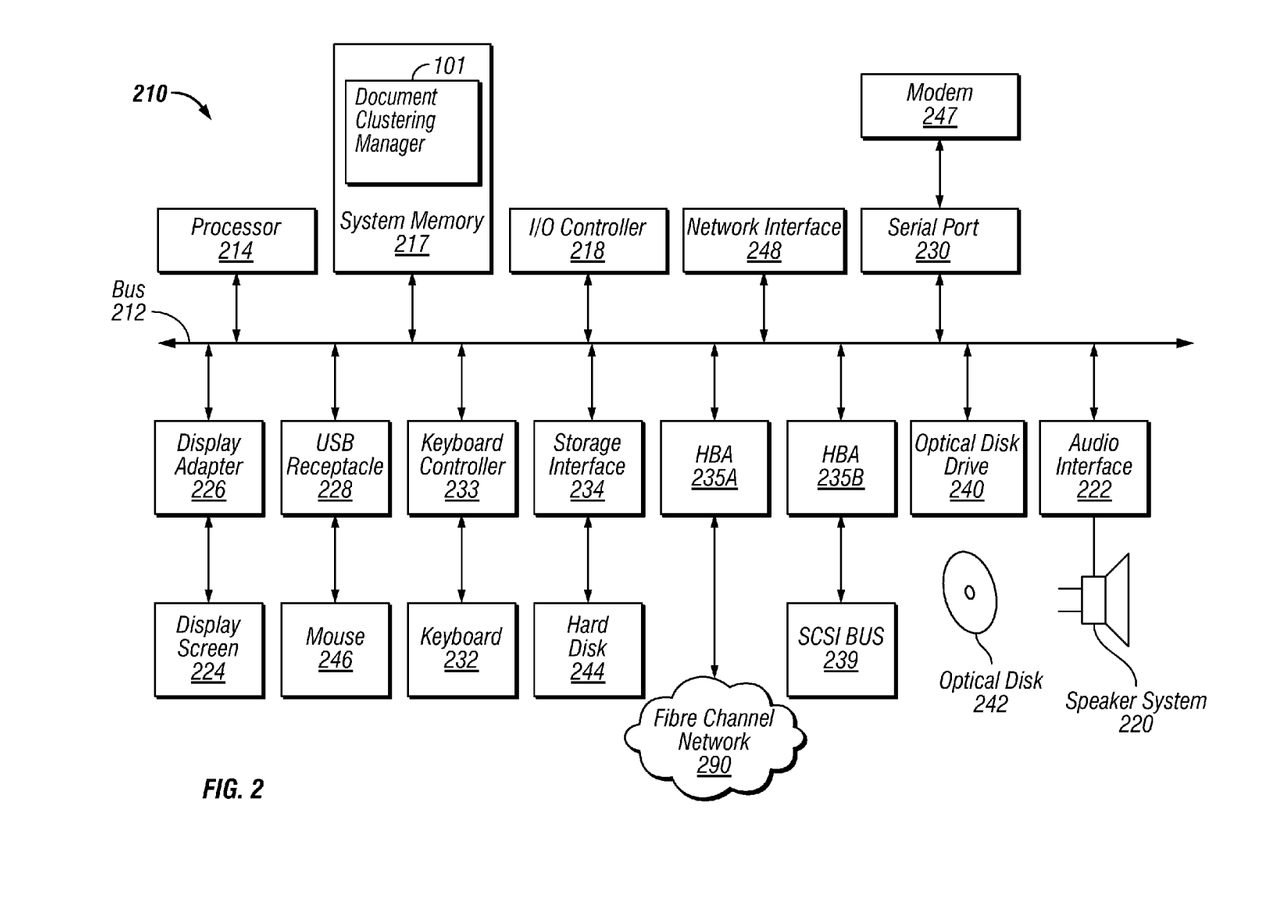
FIG. 2 is a block diagram of a computer system suitable for implementing a document clustering manager, according to some embodiments.

FIG. 2 is a block diagram of a computer system 210 suitable for implementing a document clustering manager 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the document clustering manager 101 is illustrated as residing in system memory 217. The workings of the document clustering manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
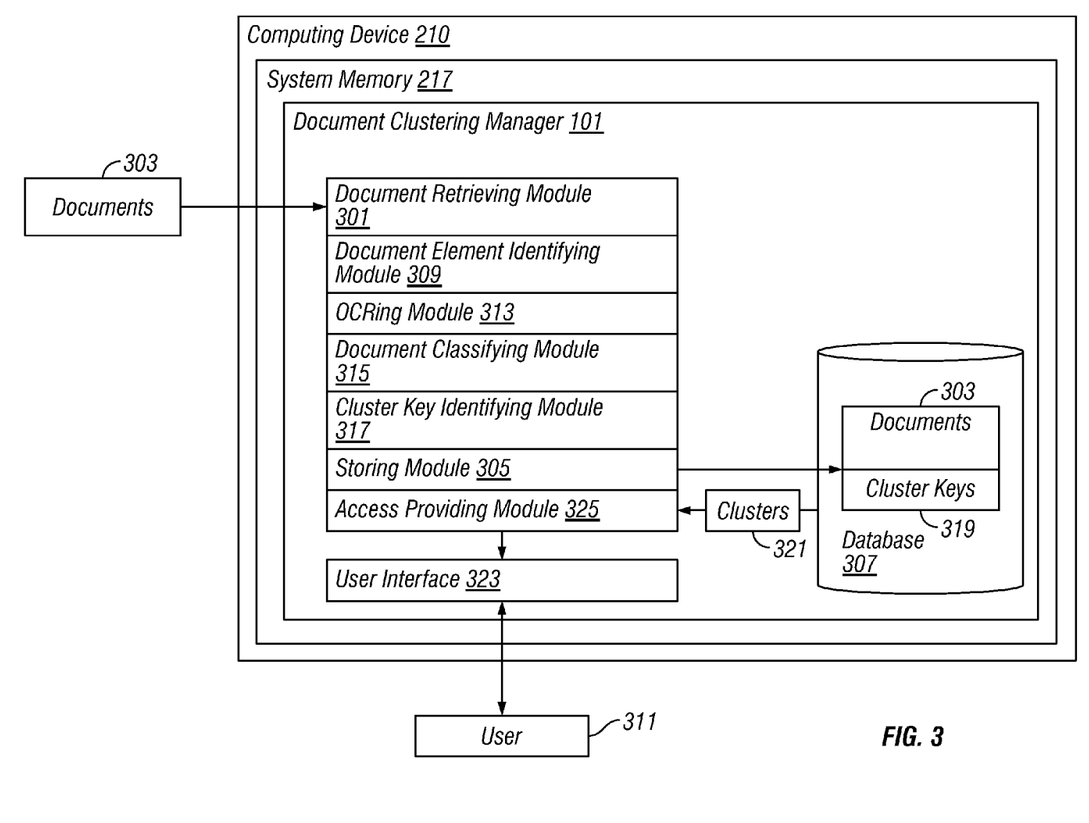
FIG. 3 is a block diagram of the operation of a document clustering manager, according to some embodiments.

FIG. 3 illustrates a document clustering manager 101 running in the system memory 217 of a server 105, according to some embodiments. As described above, the functionalities of the document clustering manager 101 can reside on a server 105, a client 103 (including but not limited to a client 103 in the form of a mobile computing device), or be distributed between multiple computer systems 210, including within a cloud-based computing environment in which the functionality of the document clustering manager 101 is provided as a service over a network 107. It is to be understood that although the document clustering manager 101 is illustrated in FIG. 3 as a single entity, the illustrated document clustering manager 101 represents a collection of functionalities, which can be instantiated as a single or multiple modules on one or more computing devices 210 as desired. FIG. 3 illustrates a specific embodiment in which the document clustering manager 101 is instantiated in the form of specific, multiple modules. In other embodiments, the functionalities of the document clustering manager 101 are distributed and/or instantiated in other ways. It is to be understood that the modules of the document clustering manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the document clustering manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

The document clustering manager 101 automatically clusters documents 303 around entities that have contextual meaning to individuals, thereby enabling individual users 311 to identify and access managed documents 303 in a manner that is intuitive to them. As explained in greater detail below, the entities around which documents are clustered can be in the form of various people, places or things that are associated with the individual. For example, documents 303 can be clustered around people known to the user 311 (e.g., documents 303 pertaining to a given relative, friend, business associate, etc.), the user's real estate (e.g., documents 303 concerning a primary residence, vacation home, apartment, time share, commercial property, etc.), individual physical possessions or sets thereof (e.g., documents 303 about a specific vehicle, entertainment system, piece of office equipment, home computer system, stamp collection, etc.), financial instruments (e.g., documents 303 concerning the user's retirement plans, investments, loans, etc.), events (e.g., documents 303 from a wedding, vacation or other life event), places, etc.

As explained in greater detail below, the document clustering manager 101 can identify and contextualize non-word character sequences that are present in multiple documents 303, such as a specific vehicle identification number (VIN), for example that of a specific 2008 blue Honda Civic owned by the user 311. The VIN would be found in, for example, both an auto insurance policy and a vehicle registration card. These documents 303 could then be clustered around the entity corresponding to that specific vehicle. In some embodiments, the document clustering manager 101 performs more complex clustering functions, such as recognizing linked identifiers. For example, the document clustering manager 101 could recognize a vehicle license plate number that is present in both an automotive repair shop invoice and the above-noted vehicle registration card, the latter of which is clustered with the specific vehicle entity for the user's car based on the VIN. The document clustering manager 101 could then link the VIN and the license plate number via the vehicle registration card, and cluster the insurance policy, repair invoice, registration card (and other documents containing the VIN or plate number) around the vehicle entity.

In order to enable entity-based clustering of documents 303, a document retrieving module 301 of the document clustering manager 101 uploads or otherwise retrieves documents 303 associated with individual users 311 from one or more sources. In some embodiments, the document retrieving module 301 can be in the form of a website or application that supports uploading documents 303 to a server 105 or other central storage location. Users 311 can identify specific documents 303, types of documents 303 and/or folders to be uploaded, for example by operating a graphical user interface. Thus, the user 311 can direct the document retrieving module 301 to upload documents 303 meeting desired criteria from the user's computer 210 or from other locations where the user 311 stores documents 303, such as a cloud based storage mechanism. Instead or in addition, the document retrieving module 301 can perform document 303 uploading automatically, using factors such as document 303 content, names of files and folders, file attributes (e.g., creation dates, modification times), etc. In some embodiments, the document retrieving module 301 supports capturing and submitting documents 303 with a smartphone or other mobile computing device 210. In some embodiments, the document retrieving module 301 also automatically retrieves documents from third party sources (e.g., servers 105 of financial institutions, government agencies, etc.), by using known APIs and the like.

A storing module 305 of the document clustering manager 101 stores the retrieved documents 303 in a database 307 or other storage mechanism (e.g., a file system based storage mechanism), such that the stored documents 303 can be subsequently accessed, for example according to indexing criteria, content, time of storage, etc. Although the database 307 is illustrated as residing on a single computer 210, it is to be understood that in practice the storage can be distributed across multiple physical and/or virtual storage and/or computing devices.

Before clustering documents 303 around specific entities, the document clustering manager 101 can classify the documents 303 by type to facilitate the clustering process. More specifically, a document element identifying module 309 of the document clustering manager 101 identifies elements in documents 303 which can be used for classification. The document element identifying module 309 can parse each document 303, and identify textual elements (e.g., words, alphanumeric representations of numbers, punctuation, etc.). The document element identifying module 309 can also identify non textual elements in documents 303, such as layout information and graphical features. It is to be understood that as the term is used herein, a "document 303" can be in any computer format (e.g., doc, txt, xls, html, rtf, etc.), including non-textual image based formats, such as pdf or jpg. When processing image based formats, an OCRing module 313 of the document clustering manager 101 can perform optical character recognition (OCR) to convert images of text into text, so that textual elements can be identified in the image data. For example, the OCRing module 313 can convert a pdf file resulting from scanning printed pages of text into a doc or txt file.

A document classifying module 315 of the document clustering manager 101 utilizes identified elements to automatically classify documents 303 by type. For example, specific documents 303 can be classified as being of types such as insurance invoice, vehicle registration card, bank statement, social security card, W2 form, lease, etc. Specific types into which to classify documents 303 can vary between embodiments. The document classifying module 315 can use keyword based classification to classify documents as being of given types based on the presence of specific keywords, key phrases and/or combinations thereof. For example, the document classifying module 315 could interpret a document as being an insurance invoice based on the presence of the words "insurance," "invoice" and "farmers" (or e.g., "state farm," "mercury", etc.) in the document 303. In another example, the presence of the phrase "department of motor vehicles" and the word "registration" could indicate that the document 303 is a vehicle registration card. These are just examples of keyword based classification. The specific keywords, key phrases and combinations used by the document classifying module 315 to make given classifications is a variable design parameter. Additionally, in some embodiments the document classifying module 315 use others factors in keyword based classification, such as proximity of keywords in a document 303, multiple occurrences of keywords, case sensitivity, weighing of certain keywords, etc. In addition to (or instead of) text based classification, in some embodiments the document classifying module 315 uses image based classification techniques, such as layout classification, in which a document 303 is classified by type according to the layout of the image (e.g., classifying a specific document as a W2 form based on the layout of the boxes). In other embodiments other image based classification techniques are used, such object or facial recognition.

A cluster key identifying module 317 of the document clustering manager 101 uses the content and classifications of documents 303 to identify associations between specific documents 303 and specific entities around which documents 303 can be clustered. Such an association can be based on content of the document 303 in light of its classification. For example, where a document 303 has been classified as being a vehicle registration card, the specific VIN in the document 303 can be identified as an association of the document 303 with the corresponding vehicle entity. This association can subsequently be used to add the vehicle registration card to the cluster 321 built around the user's car, as described below. As another example, where a document 303 has been classified as being a home insurance policy, the address of the covered property in the document 303 can be identified as an association of the document 303 with the user's house. Associations between documents 303 and entities can be thought of as cluster keys, and the term "cluster key 319" is subsequently used herein to describe these associations for the purpose of readability. In addition to identifying cluster keys 319 based on document 303 content and classification, cluster keys 319 can also be manually entered by users 311, as described in greater detail below.

In one embodiment, where a given document 303 is classified as being of a type for which names and/or addresses are likely cluster keys 319 (e.g., documents 303 of types likely to be associated with specific people or residences/organizations located at specific addresses), the cluster key identifying module 317 finds any names and addresses in the document 303. The cluster key identifying module 317 can do so by identifying content which is in predictable name/address formats and/or locations. The layout information of any name or address found is checked to determine whether it appears to be that of the recipient of the document (e.g., the address is positioned to be visible on the outside of an envelope, the address is in the recipient address position of a letter, the name is in the salutation portion of a letter (e.g., "Dear John"), the address is in the bill to or ship to section of an invoice, etc.). Names and addresses that are identified as recipient fields are discarded, while those that are not (in document 303 types for which names and addresses are relevant to clustering) are identified as being cluster keys 319. Recipient addresses are not used as cluster keys 319 because the recipient is most often the user 311 on whose behalf the clusters 321 are being built. Many documents 303 are mailed to the user 311 which it is not desirable to cluster around the user's house (or other mailing address), and although the user 311 may wish to build clusters 321 based on other people, the user 311 likely does not want to build a cluster 321 around him/herself. Thus, recipient names and addresses are screened out as noise.

In one embodiment, to identify additional cluster keys 319, the cluster key identifying module 317 subjects the documents 303 to feature reduction, whereby dictionary words (e.g., words within the English lexicon, or that of a different language in other embodiments), monetary amounts, percentages, punctuation marks, and any other content considered to be noise regarding clustering of documents 303 are ignored. The exact content to ignore can vary between users 311, categories of documents 303 and embodiments, with the idea being that after stripping out content such as words appearing in a dictionary, punctuation and numbers in formats not indicative of an association between the document 303 and a type of entity of potential interest to the user 311, the remaining content will be potential cluster keys 319 such as account numbers, social security numbers, email addresses, certain proper nouns (e.g., names of companies), etc. Names of people and addresses also remain, although those of interest are identified as described above, and recipient names and addresses are screened out as noise. After a document 303 is subject to the above-described feature reduction (and address processing), any remaining item of content is identified as a cluster key 319 for the document 303. Note that these identified cluster keys 319 can be thought of as "potential cluster keys 319," because not each one is an accurate association between the document 303 in which it was found and an actual entity 303 around which the user 311 wishes documents 303 to be clustered. Therefore, corrections can be made to eliminate falsely identified cluster keys 319, as described in more detail below.

In one embodiment, the cluster key identifying module 317 identifies potential cluster keys 319 directly based on commonly occurring textual elements identified by the document element identifying module 309. For example, any textual element which occurs in the documents 303 with a requisite frequency, positioning, proximately to other elements or the like can be considered a cluster key 319. Additionally, specific textual elements can be classified as always (or never) constituting a potential cluster key as desired. The exact occurrence criteria to use to classify textual elements as potential cluster keys 319 are a variable design parameter. In one embodiment the documents 303 are classified as described above prior to such textual element based cluster key 319 identification to assist in the identification process. In a different embodiment, the classification step is not performed. In one embodiment, the set of textual elements from which potential cluster keys 319 are identified is reduced, by ignoring elements such as dictionary words, punctuation and proper nouns. As described above, in some embodiments rather than (or in addition to) identifying potential cluster keys 319 based on raw textual elements, feature reduction or other additional processing is performed.

The storing module 305 stores identified cluster keys 319 in association with given documents 303, for example in the database 307 in which the documents 303 themselves are stored, or in another database or other storage mechanism. The cluster keys 319, documents 303 and associations between them are stored such that queries can be made against cluster keys 319 and documents 303, and documents 303 can be identified and retrieved based on their associated cluster keys 319.

At this point, the documents 303 can be thought of as being organized into clusters 321 based on entities. Where any cluster key 319 is associated with more than one document 303, the collection of associated documents 303 comprises a cluster 321 based on the specific entity indicated by the cluster key 319 (e.g., the user's car, the user's employer, the user's retirement savings, etc.). An access providing module 325 of the document clustering manager 101 can provide the user 311 with access to the documents 303 according to the clusters 321 into which the documents 303 are organized.

Erroneous clusters 321 can be reduced by removing clusters 321 that contain unrelated documents 303, such as a dentist's invoice and a vehicle service invoice. The specific types of documents that are considered to be unrelated can vary between embodiments, based on factors such as categorization and document 303 content. Clusters 321 can also be automatically consolidated where the grouping indicates an erroneous cluster 321. For example, where a first cluster 321 contains ten documents 303 and a second cluster 321 contains those same ten plus eighty others, the first cluster 321 could be deleted, thereby effectively consolidating the two. The exact criteria to use for cluster 321 consolidation can vary between embodiments.

Note that a single document 303 can be in multiple clusters 321. For example, an explanation of benefits from a user's employer provided health insurance company could be associated with both the user's employee benefits entity and the user's medical records entity, and hence the document 303 would be included in both clusters 321. Additionally, a given entity can be associated with multiple cluster keys 319, as in the example given above of the VIN and the license plate number both being associated with the user's car. In such a case, documents 303 that contain one or more of the multiple cluster keys 319 (e.g., just the VIN, just the plate number or both) are included in the target cluster 321, thus in effect linking the cluster keys 319.

Listings of documents 303 organized according to clusters 321 around specific entities can be displayed to the user 311 via a user interface 323, such as a GUI. The specific documents 303 and clusters 321 can be identified by querying the database 307 for cluster keys 321 with more than one associated document 303. Users 311 can access specific documents 303 by making requests through the user interface 323. Additionally, users 311 can use the interface 323 to identify any erroneous clusters 321 for deletion, add documents 303 to clusters 321, remove them from clusters 321 and move them between clusters 321 as desired. The exact layout and format the interface 323 uses to display clustering information and accept user 311 input varies between embodiments. For example, conventional graphical user interface components can be used to display the names of entities around which the different clusters are organized and the lists of documents 303 in each cluster. Conventional graphical user interface components and functionality can also be deployed to allow users 311 to select documents 303 to open, delete from clusters, move between clusters, etc., as well as to enter and delete cluster keys 321 and the like, as described below.

Utilizing the user interface 323, the user 311 can manually enter cluster keys 319 associated with specific entities. These user 311 entered cluster keys 321 are stored, and the cluster key identifying module 317 identifies any occurrences of them in the content of the documents 303 it processes. The user 311 can also delete any non-desired cluster keys 321 which the cluster key identifying module 317 created automatically. Where this occurs, a record of the deletions is maintained, and the cluster key identifying module 317 checks the record so as not to recreate any user 311 deleted cluster keys 321. Furthermore, the user 311 can proactively enter content to screen out, which would not otherwise be treated as noise by the cluster key identifying module 317, such as the user's phone number, email address, or any other information in a format that would not automatically be interpreted as noise, yet around which the user 311 does not wish to cluster documents 303. In one embodiment, such information concerning the user 311 is automatically read from, e.g., a stored user profile or the like.

In some embodiments, publically accessible information is used to identify entities, cluster keys 321 and/or corresponding document 303 associations with greater precision. For example, a VIN (extracted from a document 303) could be used to look up the exact make, model number and year of the car it is associated with in a Department of Motor Vehicles database. In other cases, more specific information identifying an entity can be automatically gleaned from the documents 303 themselves. For example, where a number identified in a document 303 is known to be a social security number based on its format, the cluster key identifying module 317 might not be able to determine whose social security number it is from the content of the document 303 in which it was found. However, by matching the social security number with one found in another document, e.g., a social security card which also contains the holder's name, the cluster key identifying module 317 can connect the first instance with the holder. Such identifications can also be entered by the user 311, in response to prompting by the document clustering manager 101 and/or proactively.

It is to be understood that the document clustering manager 101 can execute the functionality described above in order to transform groups of documents 303 into clusters 321 built around specific entities, for example when the system is first used by a specific individual, or when groups of new documents 303 are subsequently retrieved by the document clustering manager 101 and assigned to appropriate existing or newly created clusters 321. Individual documents 303 can also be processed by the document clustering manager 101 and clustered according to the above-described functionality.

Figure 4:
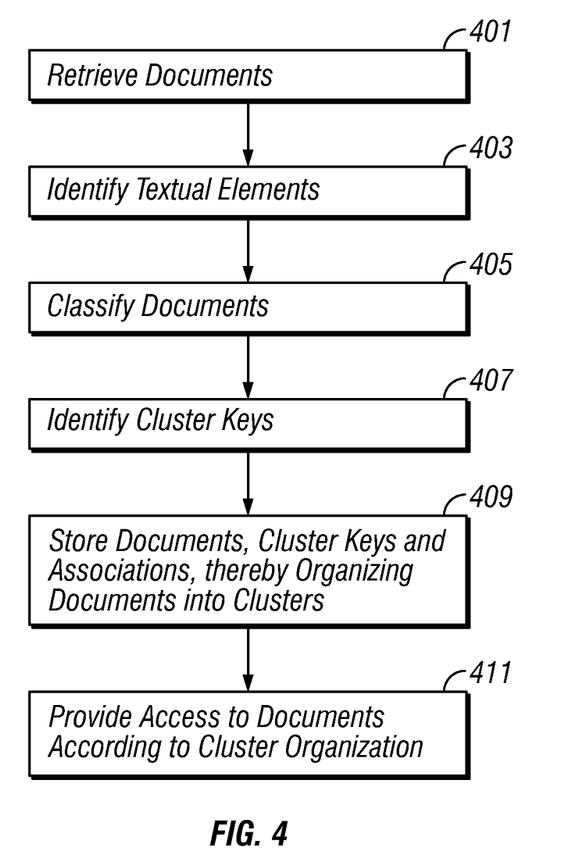
FIG. 4 is a flowchart illustrating steps of the operation of a document clustering manager, according to some embodiments.

FIG. 4 illustrates steps of the operation of a document clustering manager, according to some embodiments. The document retrieving module 301 retrieves 401 multiple documents associated with the individual user 311 from at least one source. The document element identifying module 309 identifies 403 at least textual elements in the retrieved documents 303. The document classifying module 315 classifies 405 the documents 303 according to document type, based at least on identified textual elements. The cluster key identifying module 317 identifies 407 cluster keys 319 in the classified documents 303, based at least on document content and document classification, each cluster key 319 comprising an association between a document 303 and a specific entity associated with the individual user 311, around which to cluster associated documents 303. The storing module 305 stores 409 retrieved documents 303, identified cluster keys 319 and associations between them, thereby organizing documents 303 into clusters 321 based on entities associated with the individual user 311. The access providing module 325 provides 411 the individual user 311 with access to the documents 303 according to the clusters 321 into which the documents 303 are organized.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for clustering documents around entities associated with an individual user, thereby enabling the individual user to intuitively identify and access the documents, the method comprising the steps of:

retrieving multiple documents associated with the individual user from at least one source, by a computer;

identifying specific textual elements that occur in the retrieved documents;

identifying cluster keys in retrieved documents based on at least identified textual elements, wherein a cluster key comprises an association between a document and a specific entity associated with the individual user, around which to cluster documents associated with the specific entity, comprising:

classifying a specific document as being of a type for which names and addresses are likely cluster keys;

finding at least one name or addresses in the specific document;

for each found name or address, determining whether the found name or address is that of a recipient of the specific document;

responsive to determining that the name or address is not that of the recipient of the specific document, identifying the name or address as a cluster key for the specific document; and responsive to determining that the name or address is that of the recipient of the specific document, identifying the name or address as not comprising a cluster key for the specific document;

storing retrieved documents, identified cluster keys and associations between them, thereby organizing documents into clusters based on entities associated with the individual user; and providing the individual user with access to the documents according to the clusters into which the documents are organized.

2. The method of claim 1 wherein identifying specific textual elements in the retrieved documents further comprises:

identifying textual elements and graphical elements.

3. The method of claim 1 wherein identifying specific textual elements further comprises:

performing optical character recognition on an image of text in a document, the document being in an image based format; and identifying textual elements in output of the performed optical character recognition.

4. The method of claim 1 further comprising:

classifying the documents according to document type, based at least on identified textual elements.

5. The method of claim 4 wherein classifying documents according to document type further comprises performing at least one step from a group of steps consisting of:

performing keyword based classification in which documents are classified as being of given types based on at least presence of specific keywords; and performing image based classification of at least one document.

6. The method of claim 1 wherein each entity associated with the individual user further comprises:

a person, place or thing associated with the individual user.

7. The method of claim 1 wherein identifying cluster keys in retrieved documents based on at least identified textual elements further comprises:

reducing a set of textual elements from which cluster keys are identified by ignoring dictionary words, punctuation and proper nouns.

8. The method of claim 1 wherein identifying cluster keys in documents further comprises:

performing feature reduction on a specific one of the classified documents; and identifying any features remaining after the feature reduction as being cluster keys for the specific document.

9. The method of claim 8 wherein performing feature reduction on a document further comprises:

stripping out dictionary words and at least punctuation marks, monetary amounts and percentages.

10. The method of claim 1 further comprising:

determining that at least one created cluster is erroneous; and removing the at least one erroneous cluster.

11. The method of claim 10 wherein determining that a cluster is erroneous further comprises performing at least one step from a group of steps consisting of:

1) determining that the cluster contains unrelated documents;

2) determining that the cluster is erroneous based on groupings of numbers and specific ones of documents between multiple clusters; and 3) receiving input from the individual user indicating that the cluster is erroneous.

12. The method of claim 1 wherein:

a single document is in multiple clusters.

13. The method of claim 1 wherein:

a single specific entity is associated with multiple cluster keys.

14. The method of claim 1 wherein providing the individual user with access to the documents according to the clusters into which the documents are organized further comprises:

displaying to the individual user listings of documents organized according to clusters.

15. The method of claim 1 further comprising:

receiving at least one cluster key that was manually entered by the individual user;

locating the at least one manually entered cluster key in retrieved documents; and clustering the retrieved documents according to the located at least one manually entered cluster key.

16. The method of claim 1 further comprising:

receiving an indication from the individual user to delete at least one automatically created cluster key;

deleting the at least one automatically created cluster key and any cluster organization based thereon; and in response to the user indication, not recreating the at least one deleted cluster key.

17. The method of claim 1 further comprising:

responsive to a received indication from the individual user, performing at least one step from a group of steps consisting of: adding a document to a cluster, removing a document from a cluster, moving a document between clusters, and stripping out document content which would not otherwise be stripped out as part of feature reduction.

18. At least one non-transitory computer readable-storage medium for clustering documents around entities associated with an individual user, thereby enabling the individual user to intuitively identify and access the documents, the at least one non-transitory computer readable-storage medium storing computer executable instructions that, when loaded into computer memory and executed by at least one processor of a computing device, cause the computing device to perform the following steps:

retrieving multiple documents associated with the individual user from at least one source;

identifying specific textual elements that occur in the retrieved documents;

identifying cluster keys in retrieved documents based on at least identified textual elements, wherein a cluster key comprises an association between a document and a specific entity associated with the individual user, around which to cluster documents associated with the specific entity, comprising:

classifying a specific document as being of a type for which names and addresses are likely cluster keys;

finding at least one name or addresses in the specific document;

for each found name or address, determining whether the found name or address is that of a recipient of the specific document;

responsive to determining that the name or address is not that of the recipient of the specific document, identifying the name or address as a cluster key for the specific document; and responsive to determining that the name or address is that of the recipient of the specific document, identifying the name or address as not comprising a cluster key for the specific document;

storing retrieved documents, identified cluster keys and associations between them, thereby organizing documents into clusters based on entities associated with the individual user; and providing the individual user with access to the documents according to the clusters into which the documents are organized.

19. A computer system for clustering documents around entities associated with an individual user, thereby enabling the individual user to intuitively identify and access the documents, the computer system comprising:

a processor system memory, comprising a document retrieving module residing in the system memory, the document retrieving module being programmed to retrieve multiple documents associated with the individual user from at least one source;

a document element identifying module residing in the system memory, the document element identifying module being programmed to identify at least specific textual elements that occur in the retrieved documents;

a cluster key identifying module residing in the system memory, the cluster key identifying module being programmed to identify cluster keys in the classified documents, based at least on identified textual elements, wherein a cluster key comprises an association between a document and a specific entity associated with the individual user, around which to cluster documents associated with the specific entity, wherein the cluster key classifies a specific document as being of a type for which names and addresses are likely cluster keys, finds at least one name or addresses in the specific document, for each found name or address, determines whether the found name or address is that of a recipient of the specific document, responsive to determining that the name or address is not that of the recipient of the specific document, identifies the name or address as a cluster key for the specific document, and responsive to determining that the name or address is that of the recipient of the specific document, identifies the name or address as not comprising a cluster key for the specific document;

a storing module residing in the system memory, the storing module being programmed to store retrieved documents, identified cluster keys and associations between them, thereby organizing documents into clusters based on entities associated with the individual user; and an access providing module residing in the system memory, the access providing module being programmed to provide the individual user with access to the documents according to the clusters into which the documents are organized.

* * * * *